Feb. 14, 1961 G. A. McDANIEL ET AL 2,972,095
VELOCITY SERVOSYSTEM FOR MEMORY-POINT
TRACKING SYSTEM
Filed Aug. 21, 1956 2 Sheets-Sheet 1

INVENTORS
GEORGE A. McDANIEL
GEORGE M. SALAMONOVICH
BY
ATTORNEY

INVENTORS
GEORGE A. McDANIEL
GEORGE M. SALAMONOVICH
BY
ATTORNEY

United States Patent Office 2,972,095
Patented Feb. 14, 1961

2,972,095

VELOCITY SERVOSYSTEM FOR MEMORY-POINT TRACKING SYSTEM

George A. McDaniel, Gardena, and George M. Salamonovich, Hollywood, Calif., assignors to Gilfillan Bros., Inc., Los Angeles, Calif., a corporation of California Filed Aug. 21, 1956, Ser. No. 605,691

18 Claims. (Cl. 318—329)

This invention relates to tracking devices and more particularly to manually operable apparatus for moving a controlled index at the same rate and in the same proportionate position as that of an uncontrolled object. For example, intremittent data concerning the object's position may be obtained orally by tracking system operator, for example, from a monitoring operator at a radar system indicator, or, alternatively, continuous data may be displayed for the tracking system operator in the form of a target range marker or cursor on the cathode-ray tube indicator of a radar system.

It is often necessary to make manual measurements of the velocity and displacement of a range marker rather than automatic measurements because automatic metering equipment is frequently too difficult or too expensive to design or to maintain for a particular application. Although the invention will have other applictaions, it is especially useful in systems called memory-point tracking systems where it is desirable to make manual measurements of the range and velocity of a target represented by a suitable indicia on a radar system indicator.

In the past, a single type of memory-point tracking system has most generally been employed. A block diagram of this system is shown on page 208 of "Electronic Time Measurements," volume 20 of the Radiation Laboratory Series by Chance, Ulsizer, Macnichol and Williams (McGraw-Hill, 1949). A detailed explanation of the theory behind the use of this system and its operation will be made hereinafter. It will suffice to say here that the prior art system is provided with "velocity memory" to move a controlled index, without further manual adjustment or corrections, at a rate proportional to that of an uncontrolled maker or cursor so long as the displacement error between them has been reduced substantially to zero. What is more important is the fact that all memory-point tracking systems are designed to perform this function independently of the rate at which or the time or manner in which the displacement error is reduced to zero.

The unusual utility of memory-point tracking systems over other types of manually operable tracking systems is graphically illustrated on page 212 of the above-cited reference. However, use of the above-described type of memory-point tracking system is still accompanied by several disadvantages. In the first place, manually operable means or a handwheel is generally employed with a tachometer type generator to generate a first signal proportional to the speed of the handwheel. A time drive mechanism is then employed to derive a fraction of the first signal proportional to time. A second signal is also developed which is proportional to the displacement of the handwheel. The fraction of the first signal is then added to the second signal and both are impressed upon a velocity servo to move the controlled index at a velocity proportional to the sum of these signals. This means that at the time the fraction of the first signal is equal to or only slightly greater than zero, an operator must turn the handwheel at a prodigious rate to correct the displacement error of the controlled index early in a tracking operation. Even if the handwheel is turned relatively fast, it is obvious that any correction is still made at a relatively slow rate. This situation leads to two disadvantages. In the first place, the ultimate object of a tracking system, i.e. to track an uncontrolled cursor continuously and accurately over a complete tracking interval, is at least partially defeated by the prior art system. Secondly, in the past the work required from the tracking system operator has been burdensome.

As stated previously, the fraction of the first signal increases with time. This means that the displacement correction sensitively increases with time. It is well known that human operators cannot accurately estimate time lapses. This means that after time has elapsed from an earlier correction, an operator will generally have no idea what the displacement correction sensitivity of the tracking system is, and, hence, will generally overcorrect, i.e. drive both the second and first signals of the controlled index much too high. Devices which have this characteristic type of disadvantage are described generally as not being suitably "human engineered." It is apparent that an operator can detect a displacement error and correct it rather easily, and definitely more easily than a velocity error, but this is only true if there is a constant displacement correction sensitivity. The theory behind any memory-point tracking sytem is based on the assumption that it is desirable to reduce velocity error to zero independently of the manner in which displacement correction is made, but only when displacement error is in fact reduced substantially to zero. Thus, although the above-described memory-point tracking system of the prior art is functionally and theoretically correct, it is difficult and burdensome to operate and, in addition, provides a time varying displacement correction sensitivity which tends to cause a human operator to overcorrect displacement errors, this result posing a serious disadvantage to continuous and accurate tracking.

The present invention overcomes these and other disadvantages of the prior art by providing a memory-point tracking system with a constant displacement correction sensitivity which is most suitable for the system operator. However, the invention has all the other advantages and is strictly defined as a memory-point tracking system. That is, velocity errors are reduced to zero independently of the manner in which displacement corrections are made and at a time when displacement error is reduced substantially to zero. Similar to systems of the prior art, the invention may be employed with manually operable means, a generator for producing a first signal proportional to the speed of the manually operable means, an integrating network for producing a second signal, an indicator assembly having a controlled index, e.g. to follow an uncontrolled cursor, and a velocity servo for moving the controlled index at a velocity proportional to the sum of the first and second signals. The invention specifically comprises a timing circuit for providing an input signal to the integrating network including first means for producing a signal proportional to time, and second means for dividing the first signal by the timing signal. The theory of operation of the invention will be explained in detail hereinafter including proof that it is a true memory-point tracking system by definition; however, from the structure just described, it is obvious that the second signal from the integrating network is developed as a function of time and that first signal is employed to move the controlled index through the velocity servo a distance always proportional to the displacement of the handwheel. The displacement correction sensitivity thus is always constant and the system operator may easily and rapidly correct any displacement error. Any velocity error will also be simultaneously corrected as will be explained subsequently.

It is therefore an object of the invention to provide a memory-point tracking system which may be quickly and easily operated to track an uncontrolled cursor immediately from the time it is visually displayed or from the time that its position is communicated to the tracking system operator.

It is another object of the invention to provide a memory-point tracking system having a constant displacement correction sensitivity.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
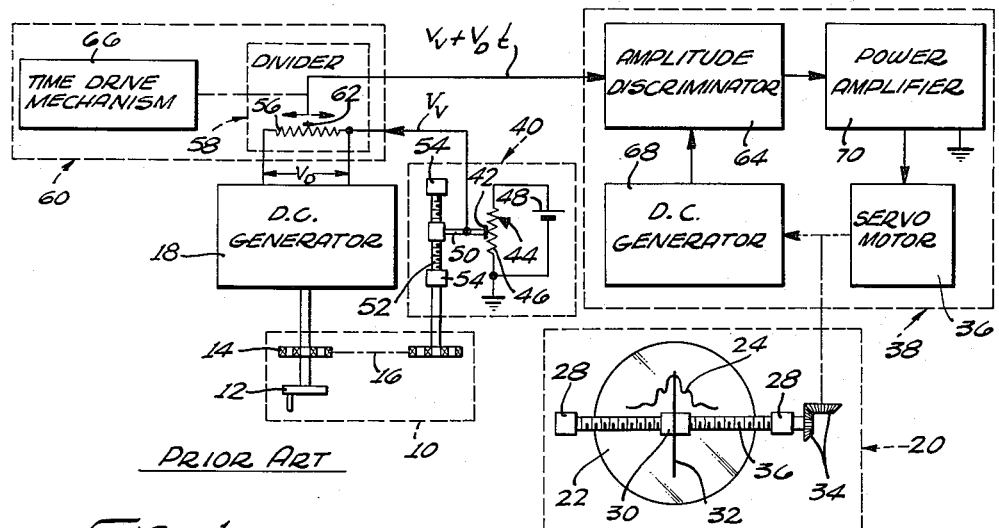
Fig. 1 is a block diagram of the memory-point tracking system of the prior art which is shown to illustrate the structural differences provided by the present invention and the improvements which may be obtained with the invention.

In order to explain the utility of the present invention and the structure in which this particular utility lies, it will be desirable to describe and explain the theory and function of the principal memory-point tracking system employed in the prior art. Such a system is shown in Fig. 1 comprising manually operable means 10 including a handwheel 12 employed to drive a pinion 14 meshed with a gear 16. The handwheel 12 is also employed to drive a D.C. generator 18 which may be a tachometer type generator. The system is in addition provided with an indicator assembly 20 including a cathode-ray type indicator 22 for an associated radar system, one of which is shown or indicated schematically in Fig. 1. The indicator 22 preferably provides a target range marker or cursor 24 in the form of light output from the luminescent screen of the tube 22. A threaded shaft 26 is then mounted in front of the tube 22 in a pair of bearings 28 provided on each side of the tube 22. A female threaded cylindrical body 30 is mounted on the threaded shaft 22 and a controlled index 32 is fixed to the member 30 to follow the marker 24 at a rate depending upon the speed of rotation of the threaded shaft 26. The shaft is in fact rotated through a pair of bevelled gears 34 which are driven by a servo motor 36 in a velocity servo 38.

An integrating network 40 is provided as shown in Fig. 1 to produce an output signal $V_V$ from a movable tap 42 of a potentiometer 44 having a resistive winding 46. Preferably a D.C. potential source 48 is connected across the potentiometer, the negative side of the source 48 being connected to ground. The tap 42 is connected to an arm 50 which is threaded to a shaft 52 which is rotated through an angle proportional to the angular displacement of the handwheel 12 by means of gear 16 to which it is connected through a pair of bearings 54. The signal $V_V$ is simply a D.C. voltage proportional to the angular displacement of the handwheel 12. The network 40 is called an integrating network because it actually integrates the angular velocity of the handwheel 12 to derive an angular displacement signal.

The D.C. generator 18 produces an output voltage or signal $V_D$ which is impressed across a resistive winding 56 of a voltage divider 58 in a timing circuit 60. An output signal is taken from the timing circuit 60 at a tap 62 of the voltage divider 58. This is subsequently impressed on an amplitude discriminator 64 in the velocity servo 38. The tap 62 is moved across the winding 56 by means of a time drive mechanism 66 in the timing circuit. The resistance of the winding 56 increases uniformly with its length and the time drive mechanism 66 generally is a synchronous motor. The output signal of the timing circuit 60 impressed on the amplitude discriminator 64 thus is equal to a fraction of the signal $V_D$ plus the signal $V_V$, the tap 42 of the integrating network 40 being connected to an appropriate side of the voltage divider 58. In effect, the output of generator 18 is referenced to the signal $V_V$ which is, in turn, referenced to ground as is the velocity servo 38. The output of the timing circuit 60 taken at the tap 62 is then proportional to the quantity $V_V + V_D t$.

The time drive mechanism 66 is actuated and starts to move the tap 62 across the winding 56 normally either at the time a tracking operation starts or at the time any correction is completed, i.e. by movement of the handwheel 12 until substantial alignment of the marker 24 and the controlled index 32 in the indicator assembly 20 exists.

The velocity servo 38 which moves the controlled index 32 of the indicator assembly 20 is entirely conventional. The controlled index 32 is moved at a rate proportional to the input signal to the amplitude discriminator 64. The velocity servo 38 thus in addition to the amplitude discriminator 64 and servo motor 36 includes a D.C. generator 68 which may be a tachometer type generator similar to the generator 18 to produce a signal proportional to the speed of the servo motor 36 and controlled index 32, and a power amplifier 70 to amplify the output of the amplitude discriminator 64 to drive the servo motor 36. The amplitude discriminator 64 compares the input signal from the timing circuit 60 and the input signal from the D.C. generator 68 and then makes a servo motor speed correction through the power amplifier 70 according to the amplitude of the differences of its input signals.

In a tracking operation an operator may be orally notified of the range of a target by a radar system indicator monitor, however, generally an indicator will be provided adjacent a controlled index such as the indicator 22 adjacent the controlled index 32. As the cursor 24 moves across the face of the tube 22 or as an indicator monitor calls out longer and longer or shorter and shorter ranges, the memory-point tracking system operator will turn the handwheel 12. This will generate the signal $V_D$ and move the tap 42 on the voltage divider 44 to produce the signal $V_V$. The signal $V_V$ is then added to a fractional portion of $V_D$, i.e. a portion representing $V_D$ times time. This is performed in the timing circuit 60. This is then impressed upon the velocity servo 38 which then drives the controlled index 32 across the face of the indicator 22.

In order to better understand the operation of the system of the prior art shown in Fig. 1 and the system of the invention as shown in Figs. 2, 4, 5 and 6, it is desirable first to restate the object of a memory-point tracking system, define a memory-point tracking system, derive an expression of displacement as a function of velocity of the controlled index 32, and from this derivation formulate a proof of whether or not the derivation meets the object.

As stated previously, the object of a memory-point tracking system is to provide means to move a controlled index such as the controlled index 32 at a velocity equal to that of an uncontrolled marker 24 and in the same position as that of the marker. The velocity of the controlled index 32, without further adjustments or corrections, for example, by movement of the handwheel 12, should be equal to the velocity of the monitor 24 if a sufficient length of time has elapsed since the time drive mechanism 66 has started and if the displacement error, i.e. the displacement between the controlled index 32 and the cursor 24 has been reduced substantially to zero.

By definition a memory-point tracking system is a system wherein the "time constant" is proportional to time. The words used in this definition are somewhat anomalous in that the "time constant" of either an "aided" or "memory-point" tracking system is defined as $$T = \frac{dx}{dV}$$

The time constant T is actually constant in an aided tracking system, for example, see pages 203 through 207 of the previously cited Radiation Laboratory Series reference. This quantity however is not a constant in a memory-point tracking system but is proportional to time. Using this definition it may be proved that it is in fact true that as long as no displacement correction exists, substantially no velocity error will exist. In this proof, however, it is necessary to assume that the velocity of the uncontrolled marker 24 is constant. If this is true, the displacement of the marker 24 is given by the expression:

$$x_s = x_{so} + V_s t \quad (1)$$

where
$t$ is time;
$x_{so}$ is the marker displacement at $t=0$; and
$V_s$ is the velocity of the marker 24.

The displacement, $x_i$, of the controlled index 32 is given by the relationship:

$$x_i = x_{io} + x_c + \int_0^t V_i \, dt \quad (2)$$

where
$x_{io}$ is the index displacement at $t=0$;
$x_c$ is the independent displacement correction made up to the time, $t$; and
$V_i$ is the velocity component imparted to the index by a strictly "velocity input signal" which, in Fig. 1, is $V_V$.

By definition in a true memory-point tracking system, $$\frac{dx_c}{dV_i} = t \quad (3)$$

or $$dx_c = t \, dV_i \quad (4)$$

and $$x_c = \int_0^t t \, dV_i \quad (5)$$

Substituting (5) into (2) the following is obtained:

$$x_i = x_{io} + \int_0^t t \, dV_i + \int_0^t V_i \, dt \quad (6)$$

The integrals may be combined thus $$x_i = x_{io} + \int_0^t (t \, dV_i + V_i \, dt) \quad (7)$$

So that the integral may be evaluated as $V_i t$ in $$x_i = x_{io} + V_i t \quad (8)$$

Subtracting (8) from (1), the following is obtained:

$$(x_s - x_i) = (x_{so} - x_{io}) + (V_s - V_i)t \quad (9)$$

On examination of Equation 9, it is obvious that if the time drive mechanism 66 is initiated when there is no displacement error and the system is a time memory-point tracking system, the quantity $(x_{so} - x_{io})$ will be zero and velocity error, $V = V_s - V_i$, will be zero when displacement error, $E = x_s - x_i$, is zero regardless of the time or the manner in which the displacement error is reduced to zero. In fact Equation 9 may be rewritten $$V = \frac{E - E_o}{t} \quad (10)$$

where $E_o = x_{so} - x_{io}$ and from this equation it can be seen that even if $E_o \neq 0$, the effect of the factor, $E_o$, on the velocity error, V, is reduced proportionately as time goes on.

A simple mathematic proof may easily be employed to show that the system of Fig. 1 is a true memory-point tracking system and hence, will move index 32 at a rate proportional to that of cursor 34 after displacement error is reduced to zero. To prove that the system of Fig. 1 is a true memory-point tracking system, the following must be proven, where all constants of proportionality are hereafter eliminated for simplicity:

$$\frac{dx_c}{dV_i} = t$$

this being the definition ascribed in Equation 3.

According to the above recited description of the function and structure illustrated in Fig. 1, the velocity of the index responsive to the strict "velocity input signal" is:

$$V_i = V_V \quad (11)$$

but $$V_V = \theta \quad (12)$$

where $\theta$ is the angular displacement of handwheel 12. Hence, $$V_i = \theta \quad (13)$$

The independent displacement correction is given by:

$$x_c = (V_d t) \, dt \quad (14)$$

but $$V_d = \frac{d\theta}{dt} \quad (15)$$

Hence $$x_c = \int \left( t \frac{d\theta}{dt} \right) dt \quad (16)$$

The derivatives of Equations 13 and 16 with respect to time are:

$$\frac{dV_i}{dt} = \frac{d\theta}{dt} \quad (17)$$

$$\frac{dx_c}{dt} = t \frac{d\theta}{dt} \quad (18)$$

Dividing Equation 18 by Equation 17 the following is found:

$$\frac{\frac{dx_c}{dt}}{\frac{dV_i}{dt}} = \frac{t \frac{d\theta}{dt}}{\frac{d\theta}{dt}} \quad (19)$$

but $$\frac{\frac{dx_c}{dt}}{\frac{dV_i}{dt}} = \frac{dx_c}{dV_i} \quad (20)$$

and $$\frac{t \frac{d\theta}{dt}}{\frac{d\theta}{dt}} = t \quad (21)$$

Hence $$\frac{dx_c}{dV_i} = t$$

q.e.d.

The system shown in Fig. 1 is thus a true memory-point tracking system. A similar proof may and, in fact, hereinafter will be employed to show that all the embodiments of the invention as shown in Figs. 2 and 4 through 6 are also true memory-point tracking systems.

Figure 2:
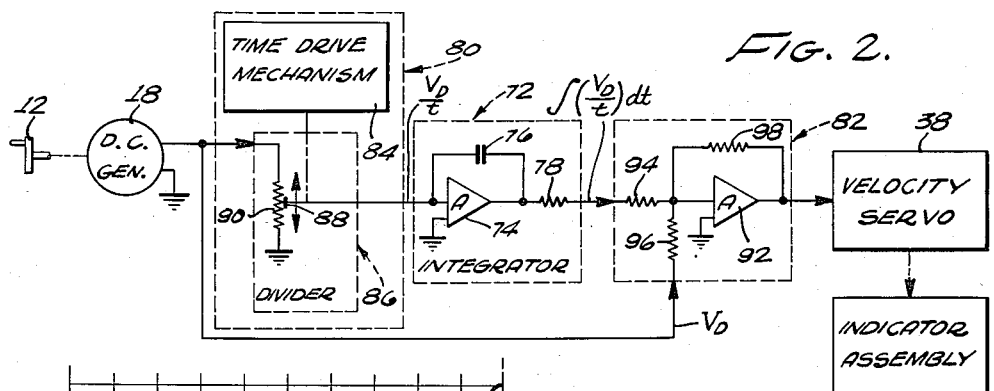
Fig. 2 is a block diagram of one embodiment of the invention.

The embodiments of the invention shown in Fig. 2 comprises a conventional handwheel 12, D.C. generator 18 to produce a signal $V_D$ proportional to the speed of the handwheel 12, the velocity servo 38 to drive the controlled index 32, not shown in indicator assembly 20. In the embodiment in Fig. 2 an integrating network 72 is provided to perform the same broad function as the integrating network 40 shown in Fig. 1, i.e. to integrate an input signal. The integrator 72 is preferably an electronic integrator rather than a mechanical or electro-mechanical integrator as shown in the integrating network 40 in Fig. 1. The electronic integrator 72 is conventional and includes an amplifier 74 with a feedback capacitor 76 and an output resistor 78.

Two additional circuits are provided in the embodiment of the invention shown in Fig. 2 in addition to the conventional ones of the prior art. They are a timing circuit 80 which differs somewhat from the timing circuit 60 shown in Fig. 1 and an adder 82. Use of the adder 82 may be eliminated as will be explained subsequently. It is obvious that addition may be made according to the manner in which it is made in Fig. 1. That is, signals such as $V_V$ and $V_D t$ may be added by virtue of potential reference connections corresponding to those of the winding 56 of voltage divider 58 and the output of integrating network 40.

Timing circuit 80 comprises a time drive mechanism 84 and a voltage divider 86. The time drive mechanism 84 is employed to move a tap 88 on a resistive winding 90 of the voltage divider 86. The signal $V_D$ produced by the D.C. generator 18 is impressed on the resistive winding 90 of the voltage divider 86. The output of timing circuit 80 is the potential of the tap 88, this potential being impressed upon the integrator 72. Adder 82 is a conventional analog adder having an amplifier 92 with a pair of input resistors 94 and 96 and a feedback resistor 98, all of the resistors 94, 96 and 98 having the same value. Inputs to the adder 82 are provided from the output of integrating network 72 and by the output of the D.C. generator 18. The output of the integrating network 72 is $$\int \left(\frac{V_D}{t}\right) dt$$

The output of D.C. generator 18, as explained previously, is $V_D$. Hence the output of adder 82 which is impressed upon velocity servo 38 is equal to the sum of these signals. The output of integrating network 72 may be called a second signal and $V_D$ may still be called a first signal. It is to be noted that index displacement correction is made by the use of the signal $V_D t$ in the prior art embodiment of Fig. 1 although in the embodiments of the invention, index displacement correction is made by the use of the first signal $V_D$. Another difference exists in the invention from the prior art in that $V_V$, which actually is proportional to $\int(V_D) dt$ in the prior art, is different from the corresponding second signal produced by the apparatus of the invention, viz.

$$\int \left(\frac{V_D}{t}\right) dt$$

In the operation of the system of the invention shown in Fig. 2, an operator is informed orally or by viewing an indicator such as the indicator 22 shown in Fig. 1 of the movement of a marker or cursor, such as the cursor 24. The handwheel 12 is then cranked to move the controlled index 32 as shown in Fig. 1 until it is at a horizontal position, which may be associated with indicia, corresponding to, for example, the range of an aircraft coming toward or going away from a radar system transmitter. If the cursor 24 is employed, the operator will turn the handwheel 12 until the controlled index 32 is in alignment with the cursor 24. As soon as the displacement error between the controlled index 32 and the cursor 24 is reduced to zero, the velocity of the controlled index 32 provided by the velocity signal to the servo 38 will then drive the controlled index 32 through the velocity servo 38 at a rate proportional to the assumed constant rate of movement of the cursor 24. This is true because the embodiment of the invention shown in Fig. 2 is a true memory-point tracking system. Proof of this will be made with respect to all of the embodiments hereinafter as stated previously. At this point, however, it is pertinent to note that the input to integrating network 72 provided by timing circuit 80 is equal to $$\frac{V_D}{t}$$

Figure 3:
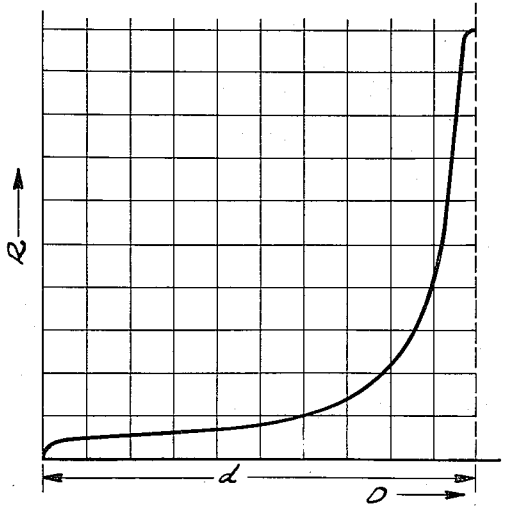
Fig. 3 is a graph of a resistance curve versus displacement of a voltage divider shown in Fig. 2.

This circuit is preferably provided with a synchronous motor for the time drive mechanism 84. In this case voltage divider 86 should be of a construction such that the resistance from one end increases as a hyperbolic function of distance to its other end. For example, as shown in Fig. 3 the resistance R from the grounded side of the winding 90 as shown in Fig. 2 may increase as the curve 100 as shown in Fig. 3 where the ordinate R represents the total resistance to a distance D from the grounded side of the winding 90, D being the abscissa of the curve shown in Fig. 3. The total length of the winding 90 is represented by $d$. It is to be noted that the curve 100 is not a perfect hyperbolic function at its extremities indicated at 101 and at 102. For purposes of measurement, however, the resistance at the ungrounded side of the winding 90 may be so high and the resistance at the grounded side of the winding 90 may be so low as to make this immaterial in relation to the operation of the system shown in Fig. 2. One feature of the invention actually resides in the use of a synchronous motor for the time drive mechanism 84 and the use of a winding on the voltage divider 86 having a resistance increasing as a hyperbolic of the distance from one end; however, it will be obvious that a modification of this feature of the invention may be made, and, in fact, other means may be substituted for the timing circuit 80 to divide the displacement signal $V_D$ by a factor equal to or proportional to time, $t$.

The time drive mechanism 84 may be initiated only once during a tracking operation or at the end of each operation of the handwheel 12, i.e. after each displacement correction is made as before. The resistance of winding 90 may, for example, be uniform throughout its length. If the resistance from the grounded side of the winding 90 to the tap 88 is defined as $R_1$, the resistance from the tap 88 to the ungrounded side of the winding 90 as $R_2$, and the total resistance of the winding 90, $R_o$, the following must be true:

$$R_1 = R_o - R_2 = \frac{1}{t} \tag{22}$$

This is based on the fact that the gain of the voltage divider 86 must be equal to $$\frac{1}{t}$$

if the output of the timing circuit 80 is to be $$\frac{V_D}{t}$$

From Equation 22 we find:

$$R_o - F = \frac{1}{t} \tag{23}$$

where $F = d - D$.

Rearranging Equation 23 the following is obtained:

$$F = R_o - \frac{1}{t} \tag{24}$$

Taking the derivative of Equation 24 the following is found:

$$\frac{dF}{dt} = \frac{1}{t^2} \quad (25)$$

Hence, if the resistance of the winding 90 is uniform, the time drive mechanism 84 must move the tap 88 along the winding 90 at a rate inversely proportional to the second power of time.

Figure 4:
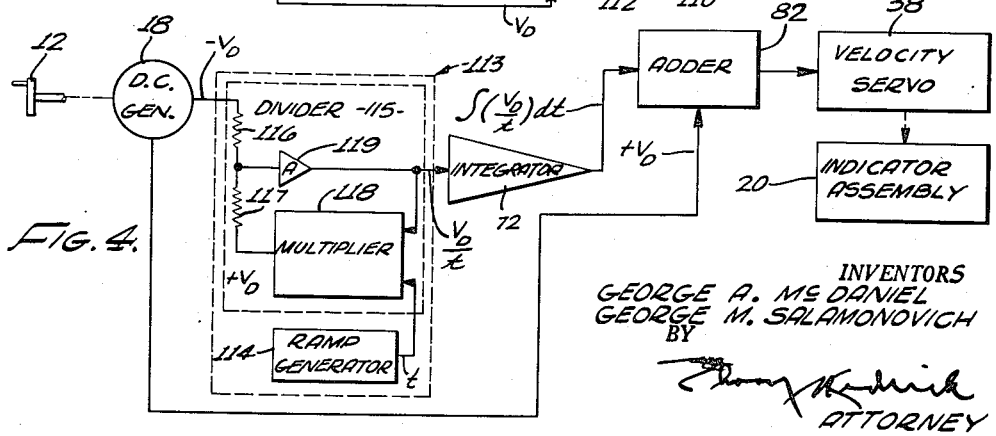

As stated previously, a timing circuit may be substituted for the timing circuit 80. This is in fact the case in the diagram shown in Fig. 4 where a timing circuit 113 has been substituted for the timing circuit 80 shown in Fig. 2. The timing circuit 113 comprises a ramp generator 114 for producing an output voltage proportional to time, $t$, and an analog divider 115 for dividing an input signal $V_D$ by the output signal of the ramp generator 114 which is proportional to time $t$. The analog divider 115 is entirely conventional having an input resistor 116, a resistor 117 connected from a feedback multiplier 118, an amplifier 119 connected from the junction of the resistors 116 and 117, the output of the amplifier being the output of the timing circuit 113 and the input to integrator 72. A second input is impressed on multiplier 118 which is the output of ramp generator 114. It is to be noted that in order to prevent the ramp generator 114 from overdriving the multiplier 118 and amplifier 119, preferably the ramp generator has a quiescent level at $D=0$, greater than 0, whereby the output of the amplifier 119 will be some limited value. Preferably the D.C. generator 18 provides an output voltage proportional to $-V_D$ and a second output voltage proportional to $+V_D$. The positive displacement signal is then introduced to adder 82 in addition to the $$\int \left(\frac{V_D}{t}\right) dt$$

which is the output of the integrator 72. The output of the adder 82 and therefore the input to velocity servo 38 is thus the same in Fig. 4, as it is in the embodiments of the invention shown in all Figs. 2, 5 and 6. Thus the operation of the embodiment of the invention shown in Fig. 4 is theoretically and functionally the same as the embodiments of the invention shown in the other Figures 2, 5 and 6.

Figure 5:
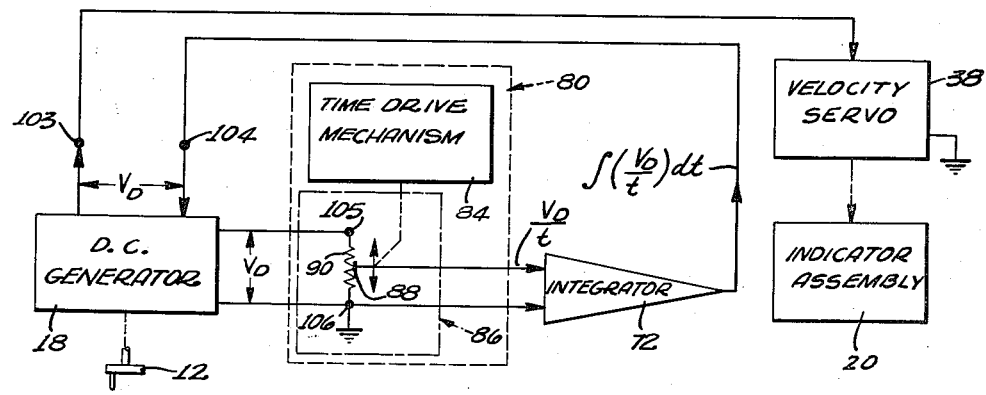
Figs. 4, 5 and 6 are block diagrams of alternative embodiments of the invention.

As stated previously, several embodiments of the invention may be employed to avoid the use of the adder 82. Such an embodiment is shown in Fig. 5, including both the timing circuit 80 of the invention and the integrator 72. The D.C. generator 18 is especially provided with two pairs of output terminals, 103, 104 and 105, 106. The pair of terminals 103, 104 are electrically isolated from the terminals 105, 106. However, the voltage generated by the D.C. generator 18 between the terminals 103 and 104 is intended to be exactly the same as that generated between the terminals 105 and 106. Specifically this voltage is the signal $V_V$. The terminal 103 corresponds electrically to the terminal 105, and the terminal 104 corresponds electrically to the terminal 106. The winding 90 of voltage divider 86 is connected between the terminals 105 and 106, the terminal 106 being connected to some point of reference potential provided in the velocity servo 38, e.g. ground. The integrator 72 is also grounded, for example, at the terminal 106. The input to the integrator 72 is taken from the tap 88 of the voltage divider 86 similar to the connection made in Fig. 2 from the timing circuit 80 to the integrator 72. Hence, the input to the integrator 72 is the same function $$\frac{V_D}{t}$$

and the output of the integrator 72 is the same function $$\int \left(\frac{V_D}{t}\right) dt$$

The output of the integrator 72 is effectively added to the signal $V_D$ appearing between the terminals 103 and 104 by a connection from the output of the integrators 72 to the terminal 104. The sum of the second signal, i.e. the output of the integrator 72 and the first signal $V_D$ appearing between the terminals 103 and 104 are then impressed on the velocity servo 38 by a connection from the terminal 103 thereto, the velocity servo 38 being referenced to ground. This connection is analogous to the connection of the integrating network 40 to the timing circuit 60 and voltage divider 58 connected from the output of D.C. generator 18 in Fig. 1.

The overall operation of the embodiment of the invention shown in Fig. 5 is substantially identical to the system shown in Fig. 2. It is also obvious that the time drive mechanism 84 in the timing circuit 80 shown in Fig. 5 and the voltage divider 86 may be identical to that shown in Fig. 2, i.e. the time drive mechanism may be a synchronous motor or means to move the tap 88 on the winding 90 at a rate inversely proportional to the second power of time. In the first case the resistance of the winding 90 will, of course, increase as a hyperbolic function of the distance from the side connected to the terminal 106. In the second case the resistance of the winding 90 may be uniform along its length.

Figure 6:
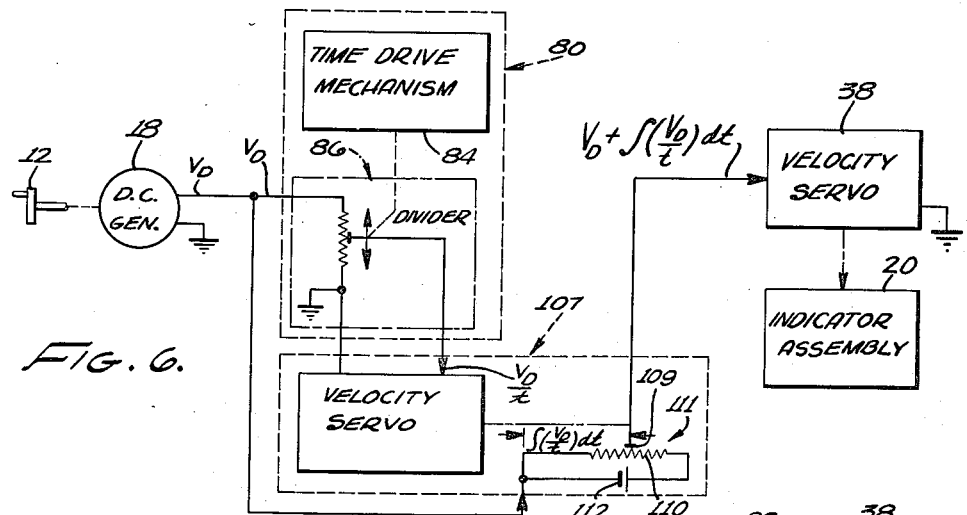

In order to eliminate the necessity of employing two pairs of isolated output terminals from the D.C. generator 18, the embodiment shown in Fig. 6 may be employed. All the elements of the invention shown in Fig. 5 may be employed in Fig. 6 with the exception of the integrator 72. An integrating network 107 is provided instead of the integrator 72, the integrating network 107 being different from both the integrating network 72 shown in Fig. 2 and the integrating network 40 shown in Fig. 1. Integrating network 107 performs the same function as all the integrators of integrating networks shown in all the figures; however, it serves to isolate the input signal $$\frac{V_D}{t}$$

impressed on it from the first signal $V_D$ itself.

The integrating network 107 is provided with a velocity servo 108 to move a movable tap 109 on a resistive winding 110 of a voltage divider 111. A potential source 112 is connected across the winding 110, the negative terminal of the potential source 112 being preferably connected to the ouput of D.C. generator 18. The output from the intergrating network 107 is taken from the movable tap 109 and impressed upon the velocity servo 38. It is apparent from the diagram shown in Fig. 5 that the second signal $$\int \left(\frac{V_D}{t}\right) dt$$

appearing between the negative side of the winding 110 and the movable tap 109 on the potentiometer 111 is referenced to ground through the D.C. generator 18 at the potential $V_D$, i.e. by the first signal $V_D$. The embodiment shown in Fig. 6 thus is analogous to the embodiment shown in Fig. 5 where the output $V_D$ of D.C. generator 18 is maintained at a selected reference potential of velocity servo 38 through integrator 72, e.g. ground. The difference is that in Fig. 6, the integrating network 107 is itself referenced to the reference potential of velocity servo 38, e.g. ground, through the D.C. generator 18. The output of integrating network 107 is thus the same as the output of adder 82 shown in Fig. 2 and the output of integrator 72 shown in Fig. 5, i.e.

$$V_D + \int \left(\frac{V_D}{t}\right) dt$$

For this reason, the theory and operation of the embodiment shown in Fig. 5 is the same as those shown in Figs. 2 and 4.

Proof of the fact that all the embodiments of the invention shown in Figs. 2, 4, 5 and 6 are true memory-point tracking systems may be made as follows.

Equation 3 must again be proven true for the specific case. Without employing constants of proportionality the strict "velocity input signal" providing index velocity, $V_i$, is given by $$V_i = \left(\frac{V_D}{t}\right) dt \qquad (26)$$

but $$V_D = \frac{d\theta}{dt} \qquad (27)$$

Hence $$V_i = \left(\frac{\frac{d\theta}{dt}}{t}\right) dt \qquad (28)$$

The independent displacement correction is:

$$x_c = \int V_D dt \qquad (29)$$

Substituting Equation 27 into Equation 29 the following is obtained:

$$x_c = \int \left(\frac{d\theta}{dt}\right) dt \qquad (30)$$

The derivatives of Equations 29 and 30 with respect to time are:

$$\frac{dV_i}{dt} = \frac{\frac{d\theta}{dt}}{t} \qquad (31)$$

$$\frac{dx_c}{dt} = \frac{d\theta}{dt} \qquad (32)$$

Dividing (32) by (31) the following is obtained:

$$\frac{\frac{dx_c}{dt}}{\frac{dV_i}{dt}} = \frac{dx_c}{dV_i} \qquad (33)$$

and $$\frac{\frac{d\theta}{dt}}{\frac{d\theta}{dt}} = \frac{d\theta}{dt} \cdot \frac{t}{\frac{d\theta}{dt}} = t \qquad (34)$$

Hence $$\frac{dx_c}{dV_i} = t$$

q.e.d.

It is to be noted that if $x_c = 0$ when $\theta = 0$, integrating Equation 32 with respect to time produces $x_c = \theta$. This means that the operator of the system of the invention has a constant displacement correction sensitivity and may make corrections more easily, accurately and rapidly than the prior art system shown in Fig. 1 where $$x_c = (V_D t) dt$$

which is an integral function of time. This is true in spite of the fact that the invention is a true memory-point tracking system and therefore provides velocity memory for a controlled index to move the index without additional correction at the rate of a moving target or cursor representing the target when the displacement between the index and cursor is reduced substantially to zero.

It will be apparent to those skilled in the art that many other changes and modifications of the invention may, of course, be made without departing from the true scope thereof as defined in the appended claims.

What is claimed is:

1. In a memory-point tracking system having manually operable means and a generator for producing a first signal, $V_D$, proportional to the speed of the manually operable means, said system also including an integrating network for producing a second signal, $V_V$, proportional to the quantity $$\int \left(\frac{V_D}{t}\right) dt$$

an indicator assembly having a controlled index, and a velocity servo for moving the controlled index at a velocity proportional to the sum of the first and second signals, a timing circuit for introducing an input signal to the integrating network, said timing circuit comprising: first means for producing a signal proportional to time, and second means for dividing the first signal by said timing signal.

2. The invention as defined in claim 1, wherein said second means is a voltage divider having a movable tap and a resistive winding connected across the output of the generator, and wherein said first means is a time drive mechanism adapted to move said tap at a rate and in a direction to produce a voltage between one end of said winding and said tap substantially proportional to $$\frac{V_D}{t}$$

where $t$ is time.

3. The invention as defined in claim 2, wherein said time drive mechanism is a synchronous motor, and wherein the resistance from said one end of said resistive winding increases substantially as a hyperbolic function of distance.

4. The invention as defined in claim 2, wherein the resistance along said resistive winding increases substantially linearly with displacement, and wherein said time drive mechanism comprises means for moving said tap across said winding at a rate substantially inversely proportional to $t^2$.

5. The invention as defined in claim 1, wherein said first means comprises a ramp generator.

6. The invention as defined in claim 5, wherein said second means comprises an analog divider.

7. In a memory-point tracking system having a manually operable means and a generator for producing a first signal $V_D$ proportional to the speed of the manually operable means, said system also including an indicator assembly having a controlled index and a velocity servo for moving the controlled index at a velocity proportional to the sum of the input signals to it, the combination comprising: means for producing an intermediate signal substantially proportional to $$\frac{V_D}{t}$$

and means responsive to said intermediate signal for producing a second signal $V_V$ substantially proportional to the integral of $$\frac{V_D}{t}$$

with respect to time, said input signals to said velocity servo being the sum of said first and second signals.

8. In a memory-point tracking system having manually operable means, an integrating network for producing a second signal $V_V$, an indicator assembly having a controlled index, and a velocity servo for moving the controlled index to the velocity proportional to the sum of its input signals, the combination comprising: means for producing a first signal $V_D$ proportional to the speed of the manually operable means, and means for producing an input signal to the integrating network proportional to $$\frac{V_D}{t}$$

where $t$ is time, said input signals to said velocity servo being said first signal and said second signal.

9. In a memory-point tracking system having manually operable means, an indicator assembly having a controlled index, and a velocity servo for moving the controlled index at a velocity proportional to the sum of the input signals to said velocity servo, the combination comprising: means for producing a first signal $V_D$ proportional to the speed of the manually operable means, means for producing an intermediate signal substantially proportional to $$\frac{V_D}{t}$$

and means responsive to said intermediate signal for producing a second signal $V_V$ substantially proportional to the integral of $$\frac{V_D}{t}$$

with respect to time, said input signals to said velocity servo being said first signal and said second signal.

10. A memory-point tracking system comprising: manually operable first means, second means for producing a first signal $V_D$ proportional to the speed of manually operable means, an indicator assembly having a controlled index, an integrating network for producing a second signal $V_V$, third means for introducing an input signal to said integrating network proportional to $$\frac{V_D}{t}$$

where $t$ is time, and fourth means for moving said controlled index at a rate proportional to the sum of said first and second signals.

11. The invention as defined in claim 10, wherein said fourth means includes an adder for adding said first and second signals together and a velocity servo responsive to the output of said adder for moving said controlled index.

12. The invention as defined in claim 10, wherein said third means includes a voltage divider having a movable tap and a resistive winding connected across the output of said second means, a time drive mechanism adapted to move said tap at a rate and in a direction to produce a voltage between one end of said winding and said tap substantially proportional to $$\frac{V_D}{t}$$

13. The invention as defined in claim 12, wherein said time drive mechanism is a synchronous motor and wherein the resistance from said one end of said resistive winding increases substantially as a hyperbolic function of distance.

14. A memory-point tracking system comprising: manually operable means, a tachometer type generator connected to said manually operable means to produce the same first voltage $V_D$ between each of first and second pairs of electrically isolated output terminals, a voltage divider having a resistive winding connected across said second pair of output terminals, a movable tap on said resistive winding, a time drive mechanism to move said movable tap across said resistive winding at a rate to produce a voltage between said movable tap and one of said second output terminals substantially proportional to $$\frac{V_D}{t}$$

where $t$ is time, said one of the output terminals of said second pair being referenced to ground, an indicator assembly having a controlled index, a velocity servo referenced to ground for moving said controlled index at a rate proportional to the amplitude of an input voltage with respect to ground, an integrator referenced to ground and connected from said movable tap to one of said first pair of output terminals, the output voltage of said integrator increasing when the potential of said one of said first pair of output terminals is negative with respect to the other, said velocity servo being connected from the other of said first pair of output terminals.

15. The invention as defined in claim 10, wherein said third means is a voltage divider having a movable tap and a first resistive winding connected across the output of said second means, and a time drive mechanism adapted to move said tap at a rate and in a direction to produce a voltage between one end of said winding and said tap substantially proportional to $$\frac{V_D}{t}$$

wherein the output signal $V_D$ of said second means is referenced to ground, wherein said integrating network comprises a second voltage divider having a movable tap and a direct current potential source connected across said second voltage divider, a first velocity servo to move said tap of said second voltage divider at a velocity proportional to the voltage of movable tap of said first voltage divider taken with respect to ground, and wherein said fourth means includes a second velocity servo referenced to ground to move said controlled index at a rate proportional to the voltage of the movable tap of said second voltage divider taken with respect to ground.

16. The invention as defined in claim 15, wherein said time drive mechanism is a synchronous motor, and wherein the resistance from one end of said first resistive winding increases substantially as a hyperbolic function of distance.

17. The invention as defined in claim 10, wherein said third means comprises a ramp generator for producing an output voltage linearly increasing with time and an analog divider for dividing said first signal by the output voltage of said ramp generator.

18. The invention as defined in claim 17, wherein said fourth means comprise an adder to add said first and second signals together, and a velocity servo for moving said controlled index at a rate proportional to the sum of said first and second signals.

No references cited.

UNITED STATES PATENT OFFICE
CERTIFICATE OF CORRECTION

Patent No. 2,972,095                February 14, 1961

George A. McDaniel et al.

It is hereby certified that error appears in the above numbered patent requiring correction and that the said Letters Patent should read as corrected below.

Column 1, line 47, for "maker" read -- marker --; column 2, line 12, for "sensitively" read -- sensitivity --; column 6, line 28, formula (14) should appear as shown below instead as as in the patent:

$$x_c = \int (V_d t) dt$$

column 7, line 1, for "embodiments" read -- embodiment --; line 4, for "the", second occurrence, read -- and --; column 8, line 38, after "hyperbolic" insert -- function --.

Signed and sealed this 9th day of Janurary 1962.

(SEAL)
Attest:

ERNEST W. SWIDER
Attesting Officer

DAVID L. LADD
Commissioner of Patents